(12) United States Patent
Peer et al.

(10) Patent No.: US 10,800,982 B2
(45) Date of Patent: Oct. 13, 2020

(54) PROCESSING SCHEME FOR PRODUCTION OF LOW SULFUR BUNKER FUEL

(71) Applicants: Eric D. Peer, Green Brook, NJ (US); John E. Duddy, Langhorne, PA (US); Sophie M. Babusiaux, Princeton, NJ (US)

(72) Inventors: Eric D. Peer, Green Brook, NJ (US); John E. Duddy, Langhorne, PA (US); Sophie M. Babusiaux, Princeton, NJ (US)

(73) Assignee: IFP Energies nouvelles (IFPEN), Rueil-Malmaison (FR)

( * ) Notice: Subject to any disclaimer, the term of this patent is extended or adjusted under 35 U.S.C. 154(b) by 0 days.

(21) Appl. No.: 16/267,437

(22) Filed: Feb. 5, 2019

(65) Prior Publication Data
US 2020/0248080 A1    Aug. 6, 2020

(51) Int. Cl.
| | | |
|---|---|---|
| C10G 65/04 | (2006.01) |
| B01J 38/20 | (2006.01) |
| B01J 29/90 | (2006.01) |
| B01J 8/32 | (2006.01) |
| B01J 38/66 | (2006.01) |
| B01J 8/18 | (2006.01) |
| C10G 9/32 | (2006.01) |
| C10G 11/18 | (2006.01) |
| C10G 25/09 | (2006.01) |
| C10G 25/05 | (2006.01) |
| B01J 8/28 | (2006.01) |

(52) U.S. Cl.
CPC ............ *C10G 65/04* (2013.01); *B01J 8/1818* (2013.01); *B01J 8/28* (2013.01); *B01J 8/32* (2013.01); *B01J 29/90* (2013.01); *B01J 38/20* (2013.01); *B01J 38/66* (2013.01); *C10G 9/32* (2013.01); *C10G 11/182* (2013.01); *C10G 25/05* (2013.01); *C10G 25/09* (2013.01); *C10G 2300/1077* (2013.01); *C10G 2400/26* (2013.01)

(58) Field of Classification Search
None
See application file for complete search history.

(56) References Cited

U.S. PATENT DOCUMENTS

| | | | |
|---|---|---|---|
| 4,003,822 A * | 1/1977 | Jo | ......................... C10G 11/18 208/102 |
| 7,704,377 B2 | 4/2010 | Duddy et al. | |
| 7,919,054 B2 | 4/2011 | Duddy et al. | |
| 2016/0160136 A1* | 6/2016 | Weiss | ..................... C10G 31/06 208/97 |

OTHER PUBLICATIONS

Hallale, et al, Refinery hydrogen management for clean fuels production, 2001, Advances in Environmental Research, vol. 6, in. 81-98. (Year: 2001).*
SO 8217 2017 Fuel Standard for Marine Distillate Fuels from dan-bunkering.com.

* cited by examiner

Primary Examiner — Derek N Mueller

(57) ABSTRACT

This invention describes a novel and efficient processing scheme that can be used to transform a vacuum residue feedstock into 0.5 wt % sulfur bunker fuel that fulfills the specifications required by the International Maritime Organization (IMO).

20 Claims, 3 Drawing Sheets

PROCESSING SCHEME FOR PRODUCTION OF LOW SULFUR BUNKER FUEL

FIELD OF THE INVENTION

This invention relates generally to methods for making marine bunker fuels having maximum 0.5 w % sulfur content consistent with the new global limits set by the International Maritime Organization, as well as to the resulting low sulfur content fuel compositions made according to such methods.

BACKGROUND

As promulgated by the International Maritime Organization (IMO), issued as Revised MARPOL Annex VI in 2008, marine fuels will be capped globally with increasingly more stringent requirements on sulfur content. In addition, individual countries and regions are beginning to restrict sulfur level used in ships in regions known as Emission Control Areas, or ECAs.

The fuels used in global shipping are typically marine bunker fuels, for larger ships. Bunker fuels are advantageous since they are less costly than other fuels; however, they are typically composed of cracked and/or residual fuels and hence have higher sulfur levels. Meeting the lower sulfur specs for marine vessels can be conventionally accomplished through the use of distillates. However, distillate fuels typically trade at a high cost premium for a variety of reasons, not the least of which is the utility in a variety of transport applications employing compression ignition engines. They are produced at low sulfur levels, typically significantly below the sulfur levels specified in the IMO regulations.

Those regulations specify, inter alia, a 1.0% by weight sulfur content on ECA Fuels (effective July 2010) for residual or distillate fuels, a 3.5% by weight sulfur content cap on global fuels (effective January 2012), which can impact about 15% of the current residual fuel supply, a 0.1% by weight sulfur content on ECA Fuels (effective January 2015), relating mainly to hydrotreated middle distillate fuel, and a 0.5% by weight sulfur content cap on global fuels, centered mainly on distillate fuel or distillate/residual fuel mixtures. In October 2016, the date of implementation for the 0.5% global sulfur cap was set at Jan. 1, 2020.

When the ECA sulfur limits and global sulfur cap drop, various reactions may take place to supply low sulfur fuels. The 0.1% by weight Sulfur ECA fuel can be challenging to supply, since shippers typically purchase lower sulfur fuel oils with properties suitable for marine applications, and at a steep price discount to distillate fuels.

These sulfur cap regulations will require significant investment on the part of refiners and/or ship owners. However, given the short timeframe for their introduction, a shift in the bunker fuels source material and its pricing is expected in order to satisfy the market needs for 2020 and beyond. Moreover, the 0.5% by weight sulfur bunker fuel price is dependent on the strategic decisions that will be taken by refiners and ship owners such as crude selection and conversion projects or exhaust gas scrubber retrofits to older ships.

Taking into consideration the tight timeframe and the level of readiness from the refining and shipping sectors, it is expected that a potentially significant part of the 0.5% by weight sulfur marine fuel will be produced by degrading valuable middle distillates, thus driving up its price. The price of transport fuels could also be impacted since large volumes of middle distillates could be diverted towards the bunker fuel pool instead of use as on-road diesel or home heating oil.

This situation can favor refiners that invest to transform part of their low-value heavy feeds into bunker fuels, securing healthy profit margins from the high price differential between 0.5% by weight sulfur bunker fuel and high-sulfur residue.

Fluid Catalytic Cracking Units (FCC's) are designed to produce high yields of gasoline from primarily vacuum gas oil feeds. The FCC also produces lower-value byproducts. One is Light Cycle Oil (LCO), a diesel boiling range stream that contains relatively high levels of aromatics and can (depending on the feed and any feed pretreating) be fairly high in sulfur content. Another is the FCC fractionator bottoms stream, commonly referred to as FCC slurry oil. This is a higher-boiling, very heavy, aromatic stream typically having a negative API gravity and with high sulfur content. The LCO is typically treated to remove sulfur and saturate aromatics (thereby increasing its low Cetane number), although reaching high Cetane numbers with LCO requires high-pressure hydrotreating. LCO can also be used as a residual fuel oil blendstock to reduce sulfur and viscosity. FCC slurry oil is typically used as a blending component for residual fuel oil, disposed of in a coking unit, or sold as a chemical feedstock. With the coming IMO regulations, it will no longer be possible to send most FCC slurry oil directly to fuel oil as its sulfur content will be too high in nearly all instances.

The uncertainty over future price of 0.5% by weight sulfur bunker fuel adds risk to any investment that aims to produce this product. A reliable way of reducing this risk is to couple the project's economics with production of other high value products such as clean transport fuels (gasoline, road diesel and jet fuel) and premium petrochemicals feedstock (propylene, naphtha for steam cracking or aromatics). Variables such as the existing refinery configuration, environmental restrictions, product prices and other location factors play a determining role on the optimum process configuration that needs to be followed in order to produce bunker fuels while ensuring an acceptable return on investment.

In light of the above, Applicants have disclosed an invention comprising a novel processing scheme that can be used to transform atmospheric or vacuum residue into 0.5% by weight sulfur bunker meeting the complete list of specifications.

These and other features of the present invention will be more readily apparent from the following description with reference to the accompanying drawings.

SUMMARY OF THE INVENTION

It is an object of Applicant's invention to describe an optimized processing configuration for production of 0.5% by weight sulfur bunker fuel from a high-sulfur atmospheric or vacuum residue.

It is a further object of the invention to describe an efficient method for treating high-sulfur FCC LCO and slurry oil that can no longer be used as bunker fuel blending components under the 2020 sulfur cap.

More particularly, the present invention describes a novel process configuration for converting of heavy oil or bitumen feedstocks to high value transportation fuels and 0.5% sulfur bunker fuel comprising:
  a) feeding a feedstock comprising a heavy oil, and a hydrogen stream to one or more ebullated-bed reactors to provide a first effluent; and b) feeding said first effluent from said one or more ebullated-bed reactors to a separation section comprising separation vessels at different temperatures and pressures to recover hydrogen-rich gases and liquid effluents, and c) feeding said liquid effluents from said separation section to atmospheric and vacuum distillation units to recover a vacuum residue stream, vacuum gas oil stream(s), naphtha stream(s), and middle distillate stream(s); and d) feeding a light cycle oil stream from a fluid catalytic cracking unit and a hydrogen stream to a fixed-bed or ebullated-bed hydrodesulfurization unit to provide a second liquid effluent and a hydrogen-rich vapor stream wherein said hydrogen stream is obtained from a portion of said hydrogen stream from step (a); and e) fractionating said second liquid effluent in a stripping column to separate a wild naphtha stream and a stabilized low sulfur light cycle oil stream; and f) blending said low sulfur light cycle oil stream with said vacuum residue stream from step c) to provide a final fuel oil product; and wherein said fuel oil product contains no more than 0.5% weight percent sulfur, less than 18% weight percent conradson carbon residue, less than 350 wppm vanadium, a density of less than 991 kg/m3 at 15° C., less than 0.1 weight percent sediment by IP-390, and a viscosity of less than 380 centistokes at 50° C.

In another scheme, invention describes a novel process configuration for converting of heavy oil or bitumen feedstocks to high value transportation fuels and 0.5% sulfur bunker fuel comprising:

a) feeding a feedstock comprising a heavy oil, and a hydrogen stream to one or more ebullated-bed reactors to provide a first effluent; and b) feeding said first effluent from said one or more ebullated-bed reactors to a separation section comprising separation vessels at different temperatures and pressures to recover hydrogen-rich gases and liquid effluents, and c) feeding said liquid effluents from said separation section to atmospheric and vacuum distillation units to recover a vacuum residue stream, vacuum gas oil stream(s), naphtha stream(s), and middle distillate stream(s); and d) feeding a light cycle oil stream from a fluid catalytic cracking unit and a hydrogen stream to a fixed-bed or ebullated-bed hydrodesulfurization unit to provide a second liquid effluent and a hydrogen-rich vapor stream wherein said hydrogen stream is obtained from the said hydrogen-rich gas streams in step (b) and said hydrogen-rich vapor stream from step (d) is thereafter returned to said separation section in step (b); and e) fractionating said second liquid effluent in a stripping column to separate a wild naphtha stream and a stabilized low sulfur light cycle oil stream; and f) blending said low sulfur light cycle oil stream with said vacuum residue stream from step c) to provide a final fuel oil product; and wherein said fuel oil product contains no more than 0.5% weight percent sulfur, less than 18% weight percent conradson carbon residue, less than 350 wppm vanadium, a density of less than 991 kg/m3 at 15° C., less than 0.1 weight percent sediment by IP-390, and a viscosity of less than 380 centistokes at 50° C.

DETAILED DESCRIPTION OF THE INVENTION

The process of Applicant's invention is broken into four distinct sections within the same overall process. Zone I shows the hydrodesulfurization (HDS) of the light cycle oil (LCO) from the fluid catalytic cracking unit (FCC). Zone II shows the hydrogen compression zone. Zone III shows the hydrogen purification section. Finally Zone IV shows the ebullated-bed residue reactor system residue hydrocacking process section. Each of these reaction zones is shown in FIGS. 1 and 2.

The configuration shown in Applicant's invention allows for the efficient and effective manufacture of low sulfur bunker fuel, as well as valuable transportation fuels, from an atmospheric or vacuum residue feedstock.

Figure 1:
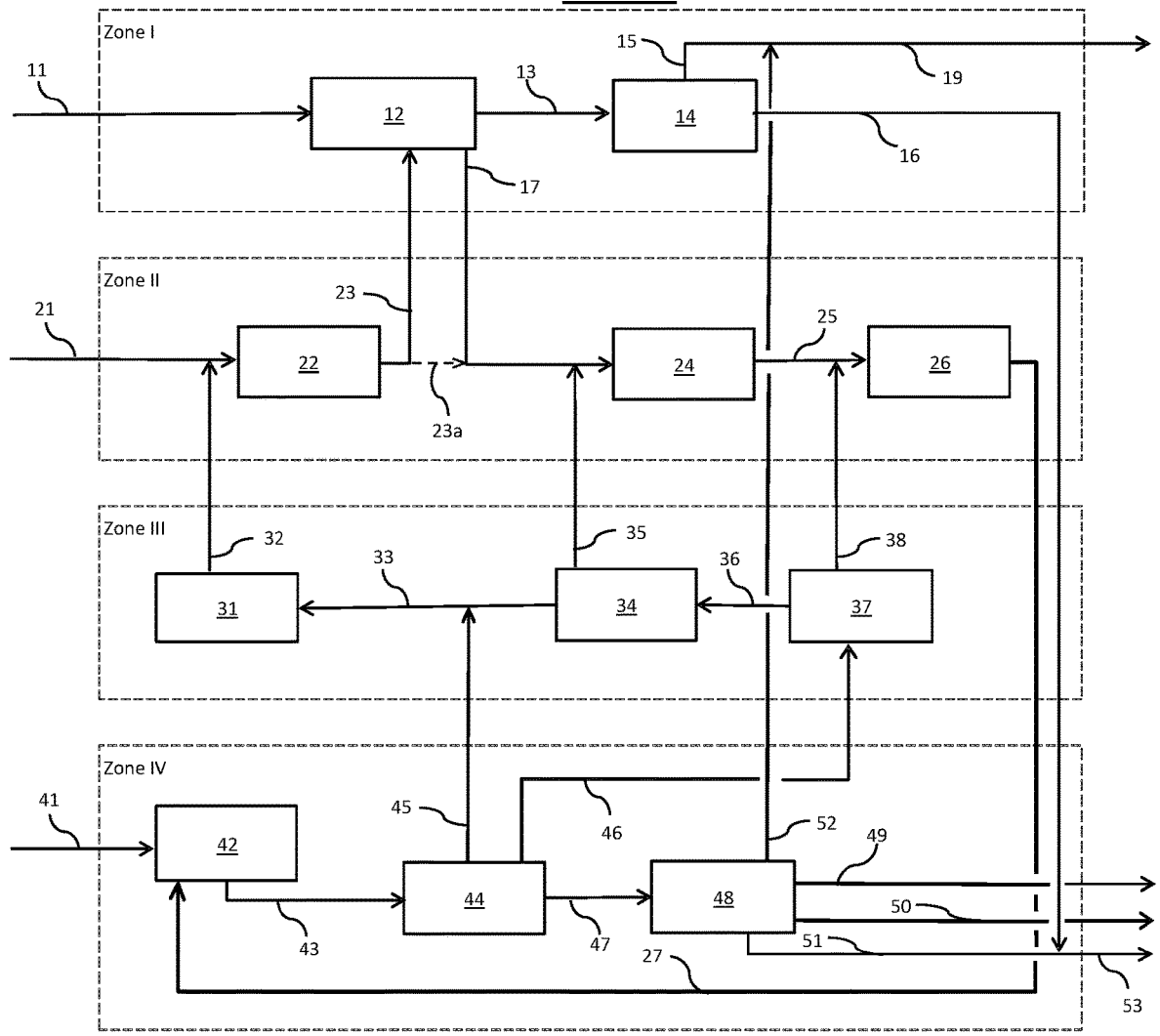
FIG. 1 shows a flow-chart outlining an exemplary process for making a low sulfur bunker fuel from an atmospheric or vacuum residue feed stock as described herein.
Figure 2:
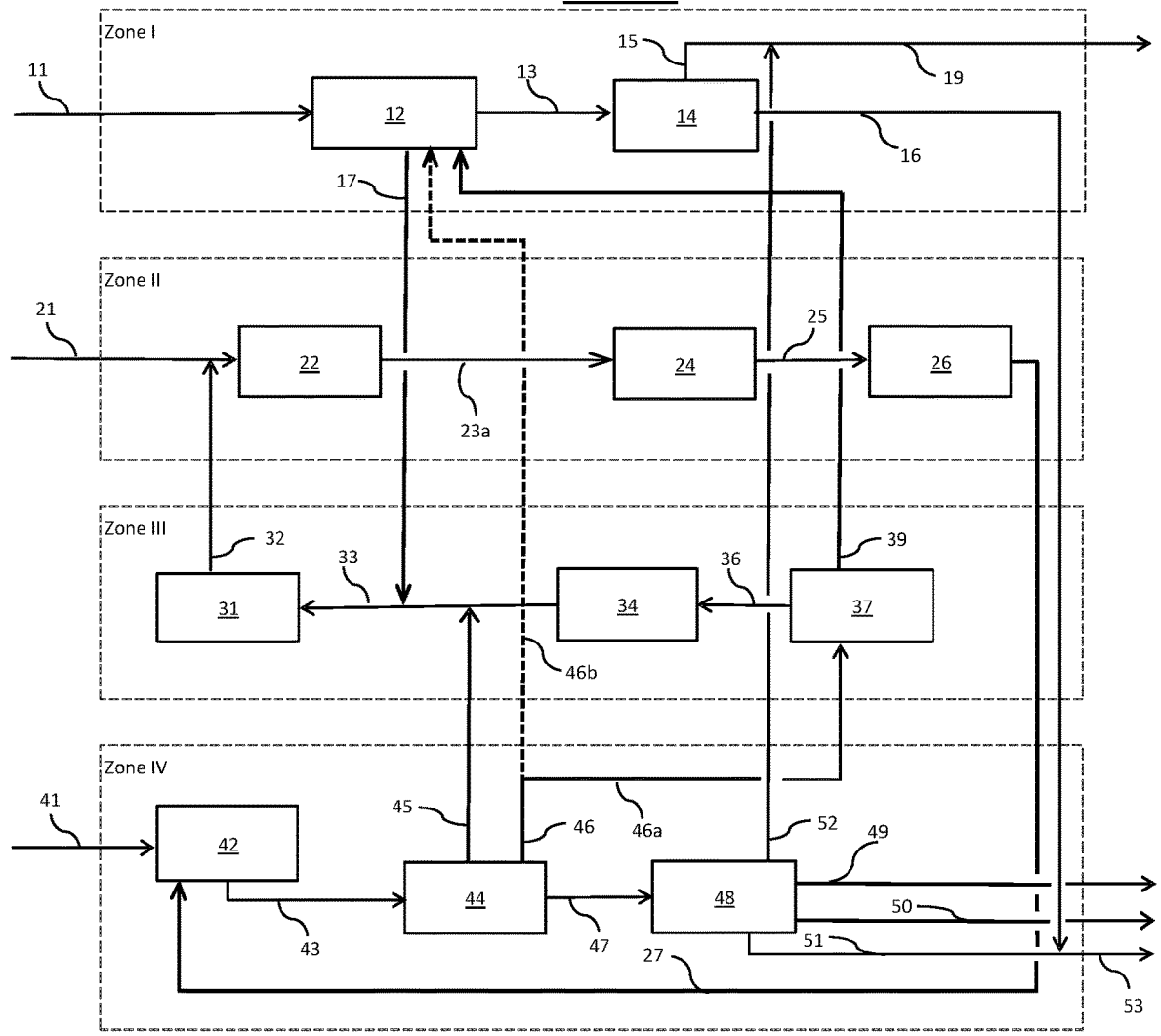
FIG. 2 shows an alternate integrated processing scheme which has a different source of hydrogen for the light cycle oil (LCO) hydrodesulfurization (HDS) section.

FIG. 1 shows a flow-chart outlining an exemplary process for making a low sulfur bunker fuel from an atmospheric or vacuum residue feed stock as described herein. In Zone I, the LCO 11 from a fluid catalytic cracking unit (FCC) (not shown) is treated separately in an HDS unit 12 with some or all of the hydrogen 23 from the first stage of the common make-up hydrogen compressor 22 originating from the hydrogen compression zone (II). The hydrogen 23 from the first stage of the common make up compressor operates at a pressure of about between 35 to 75 bar (approximately 508 to 1088 psi) and preferably 40 to 70 bar (580 to 1015 psi).

The HDS unit 12 may be a fixed-bed or ebullated bed reactor. Part of the hydrogen 23a from the first stage of the common make-up hydrogen compressor 22 may be sent to the second stage of the common make-up compressor 24 at the same pressures as specified for the hydrogen 23.

Hydrodesulfurization zone I operates on a once-through hydrogen basis thus requiring no recycle compressor or amine absorber. The use of high-purity make-up hydrogen as feed to the HDS unit 12 allows the total pressure to be minimized while maintaining sufficient hydrogen partial pressure. The HDS unit 12 generally operates at the following conditions: pressure of 35 to 75 bar (508 to 1088 psi) and preferably at a pressure of between 40 to 55 bar 580 to 798 psi); an LHSV of 0.5 to 5 h$^{-1}$; a H$_2$/Hydrocarbon ratio of 100 to 5000 Nm$^3$/m$^3$ of feed; a temperature of between 200 to 400° C. (392 to 752° F.) and preferably between 300 to 400° C. (572 to 752° F.); a minimum hydrogen partial pressure of 25 bar (362 psi). The catalyst used in the HDS unit 12 could be cobalt molybdenum, nickel molybdenum, or a combination of these two. Cobalt molybdenum is preferred. These conditions allow for good hydrodesulfurization performance with less than 40% of aromatics saturation, which are beneficial in solubilizing the asphaltene molecules remaining the unconverted residue from the residue hydrocracking process therefore meeting the residue fuel oil stability specification. The aromatics saturation is below 40% and preferably below 15%.

The HDS unit 12 produces a liquid effluent 13 and a hydrogen-rich vapor purge gas 17. The liquid effluent 13 is sent to a stripper column unit 14 to fractionate the effluent into a wild naphtha stream 15 and a stabilized low sulfur light cycle oil stream 16 (ULS LCO). The wild naphtha stream 15 is combined with the naphtha 52 from the fractionation section 48 in Zone IV and the combined naphtha stream 19 is sent to a stabilizer column and then to a reformer (not shown) for gasoline production.

The hydrogen-rich purge gas 17 from the HDS unit 12 is combined with any hydrogen from the first stage hydrogen compression unit 22 in zone II not originally used as hydrogen feed to the HDS reactor unit 12 (stream 23a) and purified hydrogen 35 from the second stage high pressure membrane unit 34 in the hydrogen purification zone III and thereafter routed back to the second-stage section of the common make-up compressor 24 in zone II. The purified hydrogen 35 from the second stage high pressure membrane unit 34 in the hydrogen purification zone III is at a pressure of about between 30 to 70 bar (435 to 1015 psi) and preferably 35 to 50 bar (508 to 725 psi).

Compressed hydrogen 25 from the second stage section of the common make up compressor 24 is thereafter combined with purified hydrogen 38 from a first stage high pressure membrane unit 37 in the hydrogen purification zone III where it is further compressed to the required pressure for the ebullated-bed residue reactor system 42 in hydrocracking zone IV. The compressed hydrogen 25 from the second stage section of the common make up compressor 24 is at a pressure of about between 60 to 135 bar (870 to 1958 psi) and preferably 80 to 120 bar (1160 to 1740 psi).

The first stage high pressure membrane unit 37 in the hydrogen purification zone III is fed a high pressure purge gas 46 from the separation section 44 in Zone IV. The high pressure purge gas 46 is at a pressure of about between 90 to 220 bar (1305 to 3190 psi) and preferably 150 to 190 Bar (2175 to 2755 psi). Hydrogen permeate 38 from the first stage high pressure membrane 37 is sent to the suction of compressor stage 3 (26) along with hydrogen product 25 from compressor stage 2 (24). Non-permeate gas 36 from the first stage high pressure membrane 37 is routed to the second stage high pressure membrane 34 for additional hydrogen recovery. Note that the two-stage membrane arrangement is not required—a single-stage membrane could be used in which non-permeate gas 36 from membrane stage 1 (37) would go directly to the PSA Unit 31.

The ebullated-bed residue reactor hydrocracking system 42 in Zone IV may be comprised of one or more ebullated-bed reactors. The ebullated-bed residue reactor hydrocracking system 42 generally operates at the following conditions: pressure of 100 to 230 bar (1450 to 3335 psi) and preferably at a pressure of between 160 to 200 bar (2320 to 2900 psi); an LHSV of 0.05 to 5 h$^{-1}$; a H$_2$/Hydrocarbon ratio of 50 to 5000 Nm$^3$/m$^3$ of feed, and at a temperature between 300 to 450° C. (572 to 842° F.) and preferably between 400 to 430° C. (752 to 806° F.).

In the ebullated-bed residue hydrocracking system 42, any standard catalyst can be used, especially a granular catalyst comprising, on a substrate, at least one metal or metal compound with a hydrogenating function. This catalyst is most often in the form of an extrudate.

The feed stream 41 for the ebullated-bed residue reactor system hydrocracking system 42 is an atmospheric or vacuum residue oil and may also include a slurry oil feed stream along with the compressed high purity hydrogen stream 27 from the third stage common make-up compressor unit 26 in the hydrogen compression zone II. The high purity hydrogen stream 27 is generally between 84 to 100% volume H$_2$ and preferably 95 to 100% vol. H$_2$.

The ebullated-bed residue reactor system 42 feed stream 41 may include the FCC slurry oil that would normally be sent to fuel oil production, although processing of slurry oil is not mandatory. The slurry oil is generally a relatively high-sulfur stream and it would not be possible to include this stream directly in fuel oil under the new IMO regulations. Processing the residue feed 41 in the ebullated-bed residue reactor system 42 has the advantages of converting a portion of the stream to lighter products and reducing the sulfur level and, if slurry oil is included in such feed stream 41, the heavy aromatics in the slurry oil may be beneficial in maintaining a stable operation in the ebullated-bed residue reactor system 42 as well as the separation unit 44 and fractionation unit 48.

Effluent 43 from the ebullated-bed residue reactor system 42 is fed to a separation section 44 comprised of vessels operating at various temperatures and having a medium and high pressure sections to create a liquid stream 47, an MP purge gas stream 45, and an HP purge gas stream 46.

The HP purge gas stream 46 is generally at a pressure of between 100 to 230 bar (1450 to 3335 psi) and preferably 160 to 200 Bar (2320 to 2900 psi). The MP purge 45 is generally at a pressure of about between 30 to 65 bar (435 to 942.5 psi) and preferably 25 to 50 Bar (362.5 to 725 psi).

The MP purge gas 45 is combined with a non-permeate gas stream 33 from the second stage membrane 34 and fed to a Pressure Swing Adsorber unit 31 to recover high-purity hydrogen stream 32 that is fed to the first stage of the common make-up hydrogen compressor unit 22. The HP purge gas stream 46 is fed to the first stage high pressure membrane unit 37 in the hydrogen purification zone III.

The liquid stream 47 from the separation section 44 is sent to the fractionation unit 48, where it is separated into various liquid products by atmospheric and vacuum distillation. A wild naphtha stream 52 is sent to the HDS zone I as mentioned above. The wild naphtha stream 52 has TBP cut point of about between 120° to 200° C. (248° to 392° F.).

Other streams separated in the fractionation unit include a diesel stream 49, a vacuum gas oil stream 50, and vacuum residue stream 51.

Zone II represents the compression of hydrogen in several stages. Any number of stages can be used, but two to four are typical. (three stages are shown (22), (24), and (26) in FIGS. 1 and 2). The hydrogen 23 has been compressed in the first stage hydrogen to reach the appropriate pressure for the HDS unit 12 in the first hydrogen compressor stage 22, which has been fed with make-up hydrogen 21 as well as purified hydrogen 32 from the pressure swing adsorber unit (PSA) 31 from hydrogen purification zone III.

The effluent 13 from the HDS unit 12 sent to the HDS fractionation unit 14. The HDS fractionation unit 14 separates the feed stream into a naphtha stream 15 which is combined with the wild naphtha 52 from zone IV and sent to a reformer (not shown) and an ultra low sulfur light crude oil stream 16 (ULS LCO). The naphtha stream 15 also has a TBP cut point of generally about between 120° to 200° C. (248° to 392° F.).

The ULS LCO stream 16 from the HDS fractionator unit 14 is thereafter combined with vacuum residue 51 from the ebullated-bed residue reactor system fractionator unit 48 from the zone IV hydrocracking section to create the ultra low sulfur fuel oil 53 (ULSFO) stream containing no more than 0.5% weight percent sulfur, less than 18% weight percent conradson carbon residue, less than 350 wppm vanadium, a density of less than 991 kg/m3 at 15° C., less than 0.1 weight percent sediment by IP-390, and a viscosity of less than 380 centistokes at 50° C.

FIG. 2 shows an alternate integrated processing scheme which has a different source of hydrogen for the light cycle oil (LCO) hydrodesulfurization (HDS) zone I. Unless noted, operating conditions in this scheme are generally the same as described in FIG. 1 detailed description above.

In this alternative processing scheme, hydrogen purge gas 46 from the separation unit 44 in zone IV is utilized by the HDS unit 12 either directly as a HP stream 46b or after first being sent 46a to the first stage high pressure membrane unit 37 where it is further purified and sent as high purity hydrogen 39 for utilization by the HDS unit 12. The HP stream 46b operates is generally at a pressure of about between 30 to 65 bar (435 to 943 psi) and preferably at 40 to 55 Bar (589 to 798 psi). The membrane unit 37 can be either a one or two stage membrane. Stream 46a is generally at a pressure of about between 90 to 250 bar (1305 to 3625 psi) and preferably between 130 to 190 Bar (1885 to 2755 psi).

Additionally, HP purge gas 17 from the HDS Unit 12 is routed back to the PSA Unit 31 for purification along with MP Purge stream 45 from the separation unit 44.

Example 1

This invention will be further described by the following example, which should not be construed as limiting the scope of the invention.

The example shown utilizes atypical Arab Light Vacuum Residue (VR) Crude having the following properties:

TABLE 1

Feed Properties

| Crude | | Arab Light Crude | Vacuum Residue |
|---|---|---|---|
| Yields, wt % | | 100 | 20.23 |
| Nominal Range, F+ | | | 1000 |
| SPG | D60/60 | 0.859 | 1.018 |
| API Gravity | | 33.2 | 7.5 |
| Sulfur | wt % | 1.79 | 4.1 |
| Nitrogen | ppm | 803 | 3318 |
| CCR | wt % | 4.4 | 21 |
| Ni + V | ppm | 20 | 103 |
| V | ppm | | 79 |
| C7 Asphaltene | wt % | 2 | 10 |

Two residue conversion levels are considered—65% and 85 v % on a 1,000° F.+ basis. The LCO used for blending is hydrotreated in the integrated HDS section to a sulfur level of 0.1 w %. This is a fairly mild HDS duty and can be accomplished at milder conditions (higher LHSV, lower pressure) than those required to produce a final diesel product from LCO. Hydrotreated LCO properties are shown below.

TABLE 2

| | HT LCO |
|---|---|
| API Gravity | 24 |
| Sulfur, w % | 0.1 |
| CCR, w % | 0 |
| V, wppm | 0 |
| Viscosity, cSt@122oF | 2.5 |

The LCO sulfur content in this example is for illustration purposes. It is possible to desulfurize the LCO to a lower product sulfur level in the integrated HDS section. The level of desulfurization desired in the integrated HDS section will be the result of many factors, especially sulfur in the LCO feed, the sulfur content of the Ebullated-bed residue reactor system VR feed, HDS level and catalyst addition rate in the Ebullated-bed residue reactor system Unit.

Figure 3:
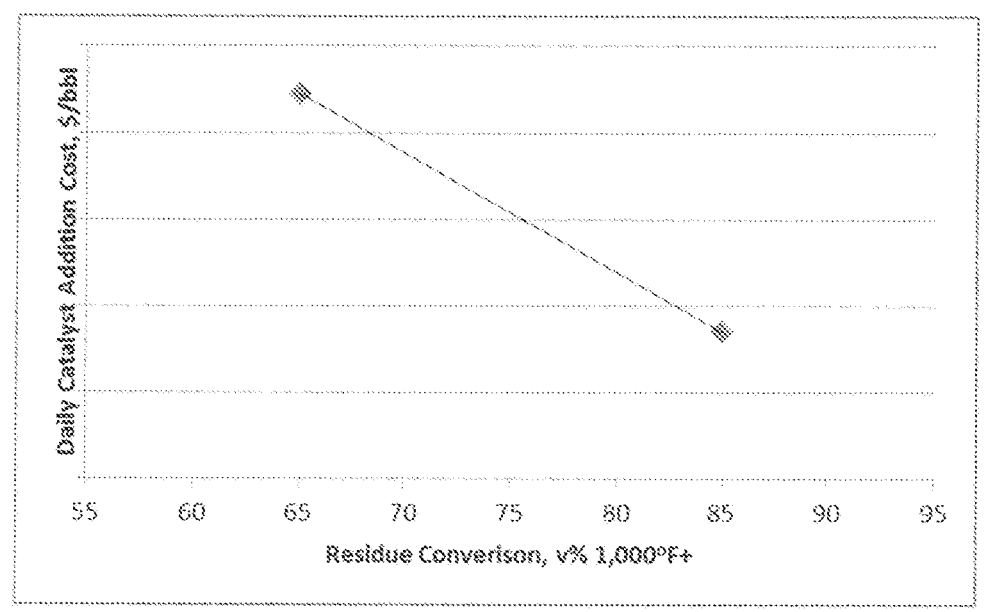
FIG. 3 shows the daily catalyst addition costs for the two examples presented.

The two residue conversion cases are at a constant feedrate and a constant reactor size (LHSV). For the lower conversion case, reactor operating temperature is reduced versus the higher conversion case. To attain the level of HDS required for producing 0.5% by weight sulfur bunker fuel, the daily catalyst addition rate is adjusted between the two cases. FIG. 3 shows the daily catalyst addition costs for the two cases presented.

Ebullated-bed residue reactor system yields and product qualities are shown in tables 3 and 4 below for the two residue conversions.

TABLE 3

Ebullated-bed residue reactor system Unit Yields

| | Residue Conversion, V % | | | |
|---|---|---|---|---|
| | 65 | | 85 | |
| Yields | % wt | % vol | % wt | % vol |
| Feeds | 100.0 | | 100.0 | |
| VR Feed | 2.2 | | 2.7 | |
| Hydrogen | | | | |
| Total | | | | |
| Products | | | | |
| H2S/NH3/H2O | 4.4 | | 4.6 | |
| Fuel Gas, including LPG | 3.7 | | 5.8 | |
| Naphtha | 5.6 | 8.2 | 10.4 | 15.0 |
| Diesel | 25.8 | 30.6 | 38.1 | 45.5 |
| VGO | 30.7 | 33.7 | 29.7 | 32.4 |
| UCO | 31.9 | 33.1 | 14.2 | 14.3 |

In the lower conversion case, fuel oil is maximized. This operation would be favored in a high bunker fuel price scenario. If the price for bunker fuel is lower, the conversion can be increased. This increases the production of $C_5$-1000° F. products by nearly 30% while reducing bunker fuel production by more than half.

TABLE 4

Ebullated-bed residue reactor system UCO and Bunker Fuel Properties

| | UCO From Ebullated-bed residue reactor system | LCO | Bunker Fuel | RMG Spec |
|---|---|---|---|---|
| 65% Conversion | | | | |
| Composition, V % | 55.0 | 45.0 | | |
| Gravity, API | 12.6 | 24 | | |
| d15/4 | 0.982 | 0.91 | 0.949 | 0.991 Max |
| Sulfur % wt | 0.82 | 0.1 | 0.50 | 0.5 Max |
| CCR, w % | 13.9 | 0 | 7.9 | 18 max |
| V, wppm | 3 | 0 | 1 | 350 max |
| Viscosity, cSt | 240,000 | 2.5 | 90 | 380 Max |
| IP 390 Sediment, % wt | | | <0.1 | 0.1 Max |
| 85% Conversion | | | | |
| Composition, V % | 55.0 | 45.0 | | |
| Gravity, API | 8.7 | 24 | | |
| d15/4 | 1.009 | 0.91 | 0.964 | 0.991 Max |
| Sulfur, % wt | 0.80 | 0.1 | 0.50 | 0.5 Max |
| CCR, w % | 20.8 | 0 | 12 | 18 max |
| V, wppm | 3 | 0 | 2 | 350 max |
| Viscosity, cSt | 2.5 MM | 2.5 | 160 | 380 Max |
| IP 390 Sediment, % wt | | | <0.1 | 0.1 Max |

TABLE 5

H Oil Unit Effluents Properties

| Product | 65% Converison | | | 85% Converison | | |
|---|---|---|---|---|---|---|
| | VGO | Diesel | Naphtha | VGO | Diesel | Naphtha |
| API | 21.1 | 34.1 | 69.4 | 19.9 | 33.2 | 68.9 |
| Sulfur, % wt | 0.25 | 0.06 | 0.01 | 0.25 | 0.06 | 0.02 |
| N, ppmwt | 1500 | 470 | <50 | 1700 | 450 | <50 |
| H, % wt | 12.0 | | | 11.8 | | |
| Ni + V, ppmwt | <1 | | | <1 | | |

The invention described herein has been disclosed in terms of specific embodiments and applications. However, these details are not meant to be limiting and other embodiments, in light of this teaching, would be obvious to persons skilled in the art. Accordingly, it is to be understood that the drawings and descriptions are illustrative of the principles of the invention, and should not be construed to limit the scope thereof.

We claim:

1. A novel process configuration for the production of low sulfur fuel products from heavy residue feedstocks comprising:
    a) feeding a feedstock comprising a heavy oil, and a hydrogen stream to one or more ebullated-bed reactors to provide a first effluent; and
    b) feeding said first effluent from said one or more ebullated-bed reactors to a separation section comprising separation vessels, said separation vessels independently maintained at different temperatures and pressures within each said separation vessel to recover hydrogen-rich gases and liquid effluents, and
    c) feeding said liquid effluents from said separation section to an atmospheric distillation unit and thereafter sending the bottoms from said atmospheric distillation unit to a vacuum distillation unit to recover a vacuum residue stream, vacuum gas oil stream(s), naphtha stream(s), and middle distillate stream(s); and
    d) feeding a light cycle oil stream from a fluid catalytic cracking unit and a second hydrogen stream to a fixed-bed or ebullated-bed hydrodesulfurization unit to provide a second liquid effluent and a hydrogen-rich vapor stream wherein said second hydrogen stream flows once-through said fixed-bed or ebullated bed hydrodesulfurization unit and is obtained at least in part from said hydrogen stream from step (a) via a common multi-stage hydrogen compression system and wherein there is no separate make-up or recycle compressor fluidly connected to said fixed-bed or ebullated-bed hydrodesulfurization unit; and
    e) feeding said hydrogen-rich vapor stream from step (d) back to a different stage of said common multi-stage hydrogen compression system where it is further compressed to be fed to step (a); and
    f) fractionating said second liquid effluent in a stripping column to separate a wild naphtha stream and a stabilized low sulfur light cycle oil stream; and
    g) blending said low sulfur light cycle oil stream with said vacuum residue stream from step c) to provide a final fuel oil product; and
    wherein said final fuel oil product contains no more than 0.5% weight percent sulfur, less than 18% weight percent conradson carbon residue, less than 350 wppm vanadium, a density of less than 991 kg/m3 at 15° C., less than 0.1 weight percent sediment by IP-390, and a viscosity of less than 380 centistokes at 50° C.

2. The process of claim 1 wherein said or one or more ebullated-bed reactors operate at a pressure of between 100 to 230 bar (1450 to 3335 psi), an LHSV of 0.05 to 5 $h^{-1}$, an $H_2$/Hydrocarbon ratio of 50 to 5000 $Nm^3/m^3$ of feed, and at a temperature between 300 to 450° C. (572 to 842° F.).

3. The process of claim 1 wherein said one or more reactors operate at a pressure of between 160 to 200 bar (2320 to 2900 psi), an LHSV of 0.05 to 5 $h^{-1}$, an $H_2$/Hydrocarbon ratio of 50 to 5000 $Nm^3/m^3$ of feed, and a temperature of between 400 to 430° C. (752 to 806° F.).

4. The process of claim 1 wherein the said fixed-bed or ebullated-bed hydrodesulfurization unit operates at pressure of between 35 to 75 bar (508 to 1088 psi), a LHSV of 0.5 to 5 $h^{-1}$, a $H_2$/Hydrocarbon ratio of 100 to 5000 $Nm^3/m^3$ of feed, a temperature of between 200 to 400° C. (392 to 752° F.) and a minimum hydrogen partial pressure of 25 bar (362 psi) and wherein sulfur is removed to a level of between 10-1000 wppm and further wherein the aromatics saturation is below 40%.

5. The process of claim 1 wherein the said fixed-bed or ebullated-bed hydrodesulfurization unit operates pressure of about between 40 to 55 bar (580 to 798 psi); a LHSV of 0.5 to 5 $h^{-1}$, a $H_2$/Hydrocarbon ratio of 100 to 5000 $Nm^3/m^3$ of feed, a temperature of between 300 to 400° C. (572 to 752° F.), a minimum hydrogen partial pressure of 25 bar (362 psi) and wherein sulfur is removed to a level of between 100-500 wppm and further wherein the aromatics saturation is below 40%.

6. The process of claim 1 wherein the catalyst utilized in step d) is chosen from a group consisting of cobalt molybdenum, nickel molybdenum, or a combination of cobalt molybdenum and nickel molybdenum.

7. The process of claim 1 wherein said one or more ebullated-bed reactors in step a) utilize a cobalt or nickel molybdenum catalyst.

8. The process of claim 1 wherein said feedstock in step (a) includes slurry oil from a fluid catalytic cracking unit (FCC) and wherein said slurry oil comprises greater than 1 weight % of said feedstock's composition.

9. The process of claim 1 wherein said feedstock in step (a) includes slurry oil from a fluid catalytic cracking unit (FCC) and wherein said slurry oil comprises greater than 10 weight % of said feedstock's composition.

10. The process of claim 1 wherein said feedstock in step (a) includes slurry oil from a fluid catalytic cracking unit (FCC) and wherein said slurry oil comprises greater than 20 weight % of said feedstock's composition.

11. A novel process configuration for the production of low sulfur fuel products from heavy residue feedstocks comprising:
    a) feeding a feedstock comprising a heavy oil, and a hydrogen stream to one or more ebullated-bed reactors to provide a first effluent; and
    b) feeding said first effluent from said one or more ebullated-bed reactors to a separation section comprising separation vessels, said separation vessels independently maintained at different temperatures and pressures within each said separation vessel to recover hydrogen-rich gases and liquid effluents, and
    c) feeding said liquid effluents from said separation section to an atmospheric distillation unit and thereafter sending the bottoms from said atmospheric distillation unit to a vacuum distillation units to recover a vacuum residue stream, vacuum gas oil stream(s), naphtha stream(s), and middle distillate stream(s); and d) feeding a light cycle oil stream from a fluid catalytic cracking unit and a second hydrogen stream to a fixed-bed or ebullated-bed hydrodesulfurization unit to provide a second liquid effluent and a hydrogen-rich vapor stream wherein said second hydrogen stream is obtained from the said hydrogen-rich gases in step (b) and thereafter flows once-through the said fixed-bed or ebullated-bed hydrodesulfurization unit and further wherein said hydrogen-rich vapor stream from step (d) is thereafter returned to said separation section in step (b); and further where said hydrogen rich gases from step (b) are compressed and fed to step (a) and wherein there is no separate make-up or recycle compressor fluidly connected to said fixed-bed or ebullated-bed hydrodesulfurization unit of step d); and e) fractionating said second liquid effluent in a stripping column to separate a wild naphtha stream and a stabilized low sulfur light cycle oil stream; and f) blending said low sulfur light cycle oil stream with said vacuum residue stream from step c) to provide a final fuel oil product; and wherein said final fuel oil product contains no more than 0.5% weight percent sulfur, less than 18% weight percent conradson carbon residue, less than 350 wppm vanadium, a density of less than 991 kg/m3 at 15° C., less than 0.1 weight percent sediment by IP-390, and a viscosity of less than 380 centistokes at 50° C.

12. The process of claim 11 wherein said one or more ebullated-bed reactors operate at a pressure of between 100 to 230 bar (1450 to 3335 psi), an LHSV of 0.05 to 5 $h^{-1}$, an $H_2$/Hydrocarbon ratio of 50 to 5000 $Nm^3/m^3$ of feed, and at a temperature between 300 to 450° C. (572 to 842° F.).

13. The process of claim 11 wherein said one or more ebullated-bed reactors operate at a pressure of between 160 to 200 bar (2320 to 2900 psi), an LHSV of 0.05 to 5 $h^{-1}$, an $H_2$/Hydrocarbon ratio of 50 to 5000 $Nm^3/m^3$ of feed, and a temperature of between 400 to 430° C. (752 to 806° F.).

14. The process of claim 11 wherein the said fixed-bed or ebullated-bed hydrodesulfurization unit operates at pressure of between 35 to 75 bar (508 to 1088 psi), a LHSV of 0.5 to 5 $h^{-1}$, a $H_2$/Hydrocarbon ratio of 100 to 5000 $Nm^3/m^3$ of feed, a temperature of between 200 to 400° C. (392 to 752° F.) and a minimum hydrogen partial pressure of 25 bar (362 psi) and wherein sulfur is removed to a level of between 10-1000 wppm and further wherein the aromatics saturation is below 40%.

15. The process of claim 11 wherein the said fixed-bed or ebullated-bed hydrodesulfurization unit operates pressure of about between 40 to 55 bar (580 to 798 psi); a LHSV of 0.5 to 5 $h^{-1}$, a $H_2$/Hydrocarbon ratio of 100 to 5000 $Nm^3/m^3$ of feed, a temperature of between 300 to 400° C. (572 to 752° F.), a minimum hydrogen partial pressure of 25 bar (362 psi) and wherein sulfur is removed to a level of between 100-500 wppm and further wherein the aromatics saturation is below 40%.

16. The process of claim 11 wherein the catalyst utilized in step d) is chosen from a group consisting of cobalt molybdenum, nickel molybdenum, or a combination of cobalt molybdenum and nickel molybdenum.

17. The process of claim 11 wherein said one or more ebullated-bed reactors in step a) utilize a cobalt or nickel molybdenum catalyst.

18. The process of claim 11 wherein said feedstock in step (a) includes slurry oil from a fluid catalytic cracking unit (FCC) and wherein said slurry oil comprises greater than 1 weight % of said feedstock's composition.

19. The process of claim 11 wherein said feedstock in step (a) includes slurry oil from a fluid catalytic cracking unit (FCC) and wherein said slurry oil comprises greater than 10 weight % of said feedstock's composition.

20. The process of claim 11 wherein said feedstock in step (a) includes slurry oil from a fluid catalytic cracking unit (FCC) and wherein said slurry oil comprises greater than 20 weight % of said feedstock's composition.

* * * * *